Figure 1:
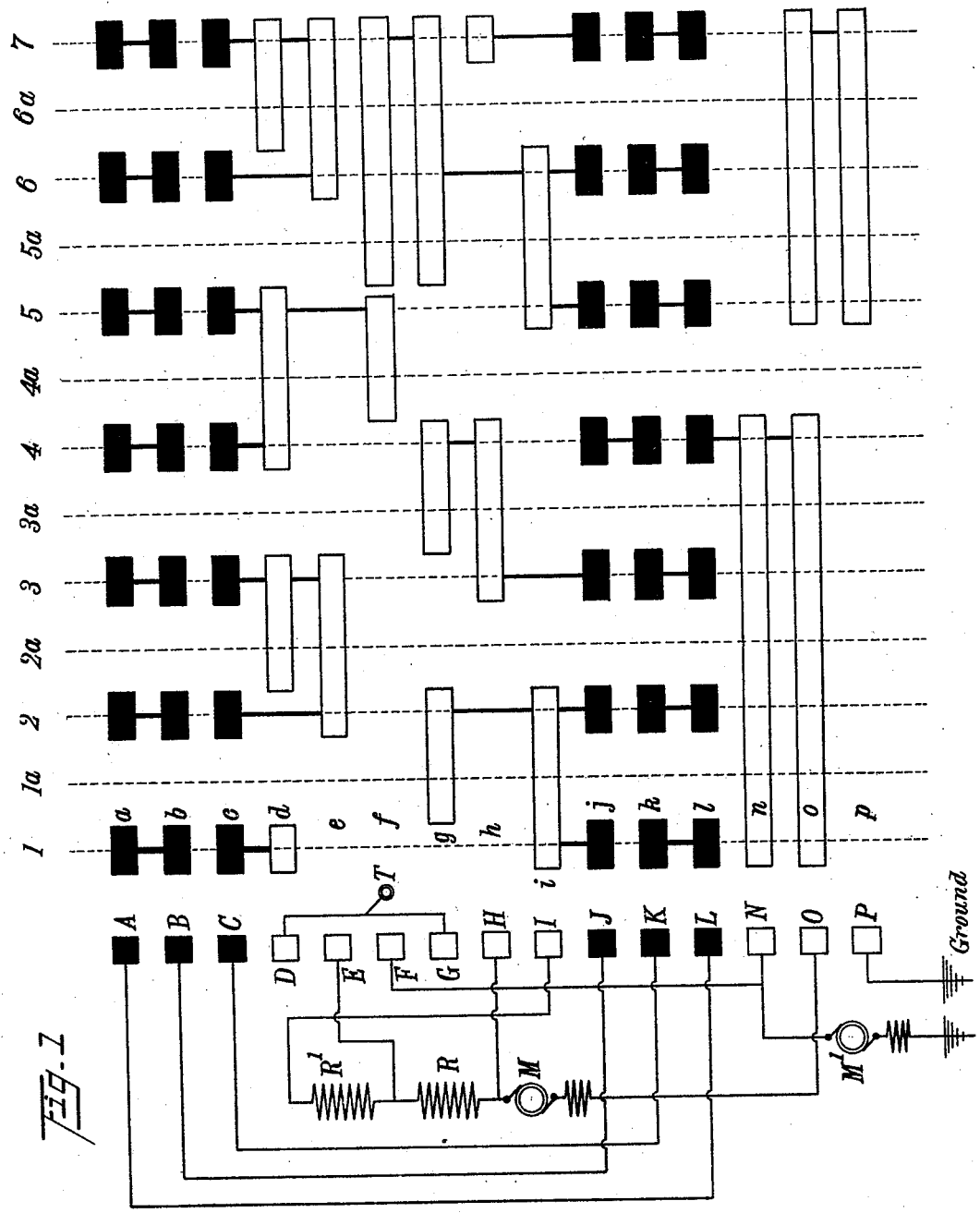

(No Model.) 3 Sheets—Sheet 1.

T. VON ZWEIGBERGK.
METHOD OF AND APPARATUS FOR CONTROLLING CURRENTS FOR ELECTRIC MOTORS.

No. 545,664. Patented Sept. 3, 1895.

WITNESSES:
F. Griswold
Helen M. Wood.

INVENTOR.
Thorsten von Zweigbergk
BY Edwin L. Thurston
ATTORNEY.

(No Model.) 3 Sheets—Sheet 2.
T. VON ZWEIGBERGK.
METHOD OF AND APPARATUS FOR CONTROLLING CURRENTS FOR ELECTRIC MOTORS.
No. 545,664. Patented Sept. 3, 1895.

WITNESSES:
F. H. Griswold
Helen M. Wood

INVENTOR.
Thorsten von Zweigbergk
BY Edwin L. Thurston
ATTORNEY.

(No Model.) 3 Sheets—Sheet 3.

T. VON ZWEIGBERGK.
METHOD OF AND APPARATUS FOR CONTROLLING CURRENTS FOR ELECTRIC MOTORS.

No. 545,664. Patented Sept. 3, 1895.

WITNESSES:
F. Griswold
Helen M. Wood.

INVENTOR.
Thorsten von Zweigbergk
BY Edwin L. Thurston
ATTORNEY.

UNITED STATES PATENT OFFICE.

THORSTEN VON ZWEIGBERGK, OF CLEVELAND, ASSIGNOR OF ONE-HALF TO GEORGE C. WORTHINGTON, OF ELYRIA, OHIO.

METHOD OF AND APPARATUS FOR CONTROLLING CURRENTS FOR ELECTRIC MOTORS.

SPECIFICATION forming part of Letters Patent No. 545,664, dated September 3, 1895.

Application filed November 1, 1894. Serial No. 527,617. (No model.)

*To all whom it may concern:*

Be it known that I, THORSTEN VON ZWEIGBERGK, a subject of the King of Sweden and Norway, residing at Cleveland, in the county of Cuyahoga and State of Ohio, have invented certain new and useful Improvements in the Method of and Apparatus for Controlling Currents for Electric Motors; and I do hereby declare the following to be a full, clear, and exact description of the invention, such as will enable others skilled in the art to which it appertains to make and use the same.

The objects of the invention are to diminish both the length and the duration of the arcs incident to reducing the current, to the end that the contacts will be less rapidly burned away, whereby repairs and replacement of contacts will cost less and will be required at less frequent intervals.

The invention consists in the method of reducing the length of the arcs in the apparatus for practicing said method and in the combination of parts for shortening the duration of the arcs, all of which will be hereinafter described, and pointed out definitely in the claims.

The invention as illustrated in the drawings is adapted to control the current on a motor-car employing two motors, which may be connected in series or in multiple arc, and two resistances, one or both of which may be connected in series with one or both motors; but it is apparent that the invention is independent of the number of motors, or the number of resistances, or the manner in which they may be connected in the circuit.

With this understanding of the scope of the invention, I will now proceed to describe my method and the apparatus which the drawings show.

Figure 2:
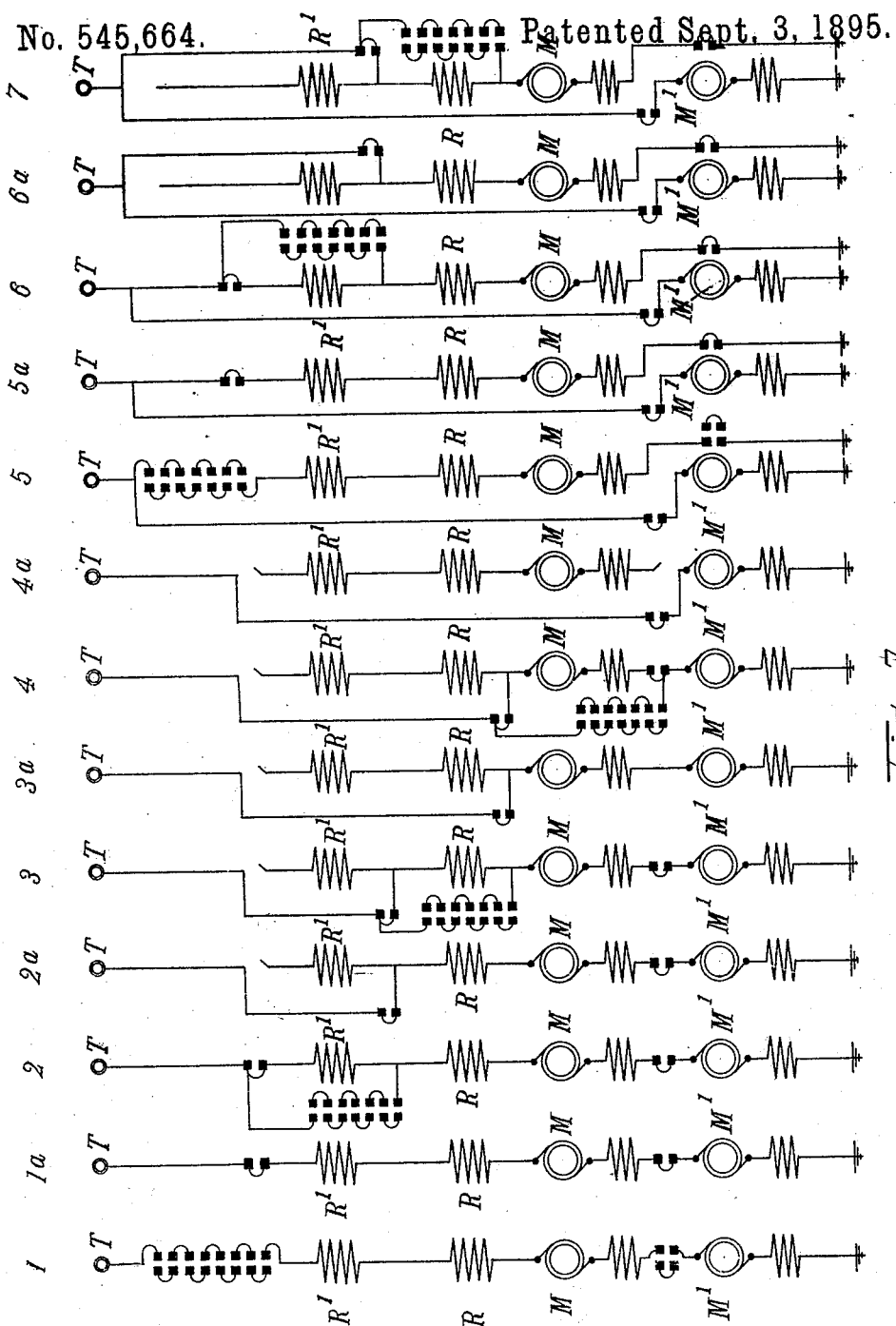
Figure 4:
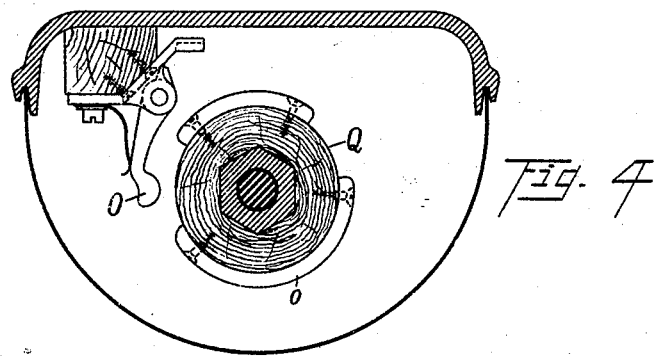
Figure 5:
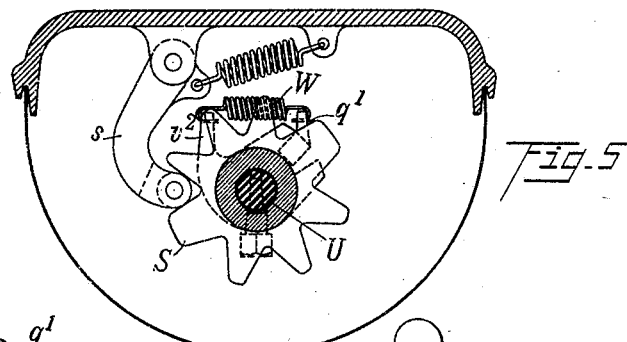
Figure 6:
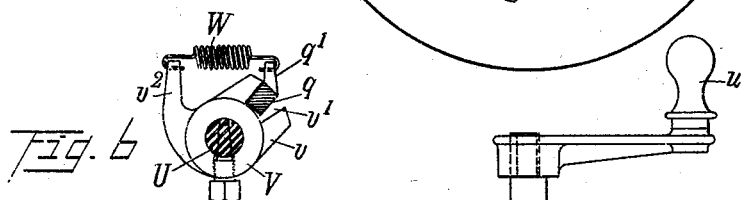
Figure 3:
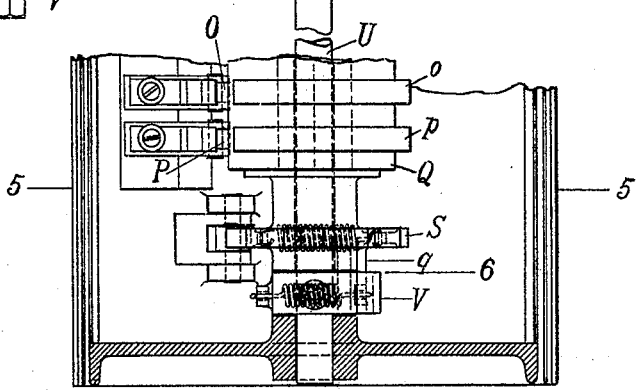

In the drawings, Figure 1 is a diagrammatic view of the movable switch, the strips carried thereby, and their connections the one with the other, and of the contact-fingers and their connections with each other and with the trolley, the motors, resistances, and ground. Fig. 2 is a diagrammatic view of the path of the current when the controller cylinder or switch is in its different positions, as indicated by the vertical dotted lines in Fig. 1. Fig. 3 is a front view of the lower end of the apparatus. Fig. 4 is a top view of that part of the controller-cylinder and contact-fingers shown in Fig 3. Fig. 5 is a sectional view on line 5, Fig. 3; and Fig. 6 is a sectional view on line 6 of Fig. 3.

Referring to the parts by letters, T represents, diagrammatically, the trolley or source of current, M M' the two motors, and R R' the two resistances. It will be noticed that the resistances and the motor M are permanently connected in series, but that there is no permanent connection of motor M to the ground. On the other hand, the motor M' has no permanent connection with the other motor or resistances, but is permanently connected with the ground. Means which will be explained are provided for connecting said motor M' into the circuit either in series or multiple arc with the other motor M, and for connecting the motor M with the ground.

A, B, C, D, E, F, G, H, I, J, K, L, N, O, and P represent the contact devices which are adapted to make the contact with the strips on the switch. These devices may be of any suitable form, although I prefer to employ pivoted fingers which are spring-pressed toward and against the strips on the switch, said fingers having metallic ends which are insulated from each other, except as indicated in Fig. 1. I shall hereinafter refer to these devices as "fingers," although, as before stated, they may be of any suitable form. I also prefer that the switch which carries the contact-strips shall be in the form of a cylinder, adapted to be turned upon a vertical axis; but these particular forms of the switch and the contact-fingers are not of my invention, nor are they essential to the practice of the method which I have invented.

The contact-strips are arranged upon the switch in horizontal rows, whereby all of the strips in each row are adapted to be touched successively as the switch is moved by the corresponding contact-finger. These horizontal rows of strips are indicated by small reference-letters *a b c*, &c., corresponding with the capital letters which indicate the corresponding contact-fingers. Thirteen different connections between the strips and the fingers are possible, although only seven changes are made thereby in the path of the current. The different lines of contact between the fingers and strips, due to different positions of the switch, are indicated by the vertical lines 1 1ᵃ 2 2ᵃ 3 3ᵃ 4 4ᵃ 5 5ᵃ 6 6ᵃ 7. The several strips are electrically connected with each other, as indicated by black lines in Fig. 1, and it is believed that it is unnecessary to explicitly explain such connections.

The horizontal rows of strips indicated by *d e f g h i n o p* constitute what I may term the "controller-strip system," because by means of these strips and the corresponding contact-fingers and their connections the circuit is varied and the current controlled.

I do not claim as my invention the arrangement of the controller-strip system on the switch nor their connection with each other, nor the connection of the motors and resistances with each other or with the contact-fingers, nor the ground connections. They are old and well known and may be varied to any desired extent, depending upon the results which it is desired to obtain by varying the circuit. They are parts of my invention only to the extent of their connection to and combination with the arc-spanning system, which I will now explain.

The arc-spanning system is made up of a plurality of separable contacts—viz., the contacts between the arc-spanning strips *a b c j k l* and the corresponding contact-fingers—which are adapted to be connected in series in the circuit before every change in the circuit for the purpose of reducing the current. It is an incident of the use of the described apparatus that the arc-spanning system is connected in series in the circuit before every change therein, whether to reduce or increase the current, although it is useful only when the current is reduced. When said contacts in the arc-spanning system have been connected in series in the particular circuit it is desired to break and the connections are made to complete the circuit in which it is desired the current shall presently pass, then all of the contacts in the arc-spanning system are simultaneously broken, thereby reducing the length of the arc as many times as there are contacts broken. It is immaterial when the connections for the reduced current are made, so long as they are made before the old circuit is broken. For example, in passing from the multiple-arc circuit (shown at 5ᵃ in Fig. 2) to the series circuit, (shown at 4ᵃ in Fig. 2,) which results from moving the switch from position 5ᵃ to 4ᵃ, Fig. 1, no new connections are made, because the circuit shown at 4ᵃ, Fig. 2, is a part of the multiple-arc circuit shown at 5ᵃ in said figure; but when the current is reduced by introducing the resistance R in the series circuit, which results, for example, from moving the switch from position on 3ᵃ to 2ᵃ— that is to say, in changing the circuit shown at 3ᵃ to that shown at 2ᵃ, Fig. 2—said resistance is connected in series with the two motors by the contact of finger E with strip *e* at the same time that the arc-spanning system is introduced into that part of the old circuit which must be broken to force the current to flow through said resistance. It will thus be understood that it is immaterial as to when the connections for the reduced current are made, whether before or simultaneous with or after the arc-spanning system is connected in the old circuit, provided they are made before the contacts of said arc-spanning system are broken.

I will now trace the circuits in some of the different positions of the switch, beginning with that indicated by 7 on Fig. 1, the circuit being diagrammatically indicated at 7 on Fig. 2. The current from the trolley T divides, passing to the two fingers D and G. From G it passes to strip *g*, to strip *f*, to finger F, then to and through motor M' to the ground. From finger D the current passes through the following parts in the order named: Strips *d c*, fingers C K, strips *k l*, fingers L A, strips *a b*, fingers B J, strips *j h*, finger H to motor M, to finger O, strips *o p*, finger P to the ground. At the same time strip *d* is connected by strip *e* and finger E to the resistance R, so that the circuit which includes said resistance in series with motor M is completed; but the current, preferring the path of least resistance, goes to the motor M by the path before described, and not through said resistance. It will be seen that the arc-spanning system forms a part of the circuit which conducts the current to the motor M and forms a shunt around the said resistance R.

When the switch is moved to the position indicated by 6ᵃ, all of the contacts between the arc-spanning strips *a b c j k l* and the corresponding fingers and between the strip *h* and finger H are simultaneously broken, and that division of the current which before passed through the arc-spanning system to motor M now passes by way of finger D, strips *d* and *e*, and finger E to the resistance R and thence to motor M.

When the switch is moved to the position indicated by 6, contact is made between the finger I and strip *i*, and immediately thereafter the strip *d* passes from beneath the finger D, and contact is made between all of the arc-spanning strips and their fingers. The current now passes to motor M by the same path as before. It passes also to resistance R and motor M by the following path: finger G, strips *g* and *j*, fingers J and B, strips *b* and *a*, fingers A and L, strips *l* and *k*, fingers K and C, strips *c* and *e*, finger E, to resistance R. A connection is also made by strips *g* and *i*, finger I, to resistance R'. The current does not, however, pass through resistance R', preferring the path of less resistance, through the arc-spanning system to the resistance R.

When the switch is moved to the position 5ᵃ, the contact between all of the arc-spanning strips and their fingers and between strips *e* and finger E are simultaneously broken, and thereupon one part of the current passes by the described path to and through both resistances R R' and the motor M.

When the switch is moved to the position 5, contact between strips $f$ and $g$ and their fingers is broken; but before this is done (owing to the width of the fingers) new contacts are made between fingers A, B, C, D, F, J, K, and L and the corresponding strips. The arc-spanning system is now connected in series in the circuit, the two parts of which are made up as follows: trolley to finger D, strips $d\ f$, finger F, to motor M'. The other branch is from strip $d$ to strip $c$, fingers C K, strips $k\ l$, fingers L A, strips $a\ b$, fingers B J, strips $j\ i$, finger I, to resistances R R' and motor M.

When the switch is moved to the position 4ª, the contact between all of the arc-spanning strips and their fingers and between the strips $i$, $o$, and $p$ and their fingers are simultaneously broken, (nine breaks,) thereby cutting out the part of the circuit which includes the resistances and motor M, and the current is changed from multiple arc to series.

When the switch is moved to position 4, the contact between finger F and strip $f$ is broken, but before that is done new contacts are made between the strips $a$, $b$, $c$, $g$, $h$, $j$, $k$, $l$, $n$, and $o$ and their fingers, whereby the circuit of the current is as follows: trolley to finger D, strips $d\ c$, fingers C K, strips $k\ j$, fingers J B, strips $b\ a$, fingers A L, strips $l\ n$, finger N to motor M'. A circuit is at the same time completed which includes the motor M as follows: trolley to finger G, strips $g$ and $h$, finger H, to motor M, to finger O, strips $o\ n$, finger N to moter M'. The current does not flow over this circuit because it offers more resistance than the other.

When the switch is moved to the position 3ª, the contacts between strips $d$ and finger D and between all of the arc-spanning strips D and their fingers are broken, thereby compelling the current to pass over the other circuit described, which includes both motors in series.

It is believed that it is unnecessary to describe in detail the changes in the circuit as the switch is moved to introduce successively the two resistances. It will be seen that, preparatory to introducing each resistance, the contacts in the arc-spanning system are connected in series in the old circuit. The connection is made to complete the circuit which includes said resistances, and then the old circuit is broken by breaking contact at seven places simultaneously, including the six contacts in the arc-spanning system. When the current is cut off completely, the switch is turned past position 1, and simultaneously ten contacts in series are broken.

It will be noticed that the strips forming parts of the arc-spanning system are so arranged that they form parts of the circuit in every alternate position the switch assumes to change the path of the current—that is to say, in every alternate vertical row of strips. Thus every change in the path of the current to reduce it involves two steps: first, introducing into the old circuit, in series, the contacts of the arc-spanning system, and, as a part of this step, when necessary, connecting up the new circuit for the reduced current; second, simultaneously breaking a plurality of contacts in the old circuit; or, to more specifically describe this step as practiced by the described apparatus simultaneously breaking contact between all of the arc-spanning strips and their fingers and between one of the controller-strips and its finger, which formed a part of the old circuit, never less than seven breaks. It will also be noticed that in passing from multiple arc to the series circuit and in shutting off the current (two points where the longer arcing occurs) a greater number of contacts are broken—viz., in the first case nine, and in the second case ten.

It is not intended that the switch shall be stopped in any but alternate positions, as indicated, and I prefer to have it stopped in the positions marked 1 2 3 4 5 6 7, because thereby the current may be reduced just a little quicker in case of an emergency. To cause the switch-cylinder to be stopped in the various positions desired, the notched indicator-wheel S is secured to the lower end of said cylinder and a spring-arm $s$ is provided, which is adapted to engage in any of said notches.

I have provided means, which I will now describe, which insures a very quick movement of the cylinder from one position in which it is to be stopped to the next position in which it is to be stopped. The switch-cylinder Q is loosely mounted on the vertical shaft U, which shaft is mounted in suitable bearings. The operating-handle $u$ is secured to the shaft. Secured to the shaft is a hub V, having the arm $v$, in which is a notch $v'$ and the arm $v^2$. An arm $q$, which is attached to the lower end of the cylinder Q, enters the notch $v'$; but it does not fill said notch, wherefore said arm $q$ and the hub V may have some independent movement. A coil-spring W is connected with the arm $v^2$ and a lug $q'$ on the arm $q$. When the shaft U is turned in the direction to reduce the current, it first, by moving the hub V, applies tension to the spring W, which tension will not generally be sufficient to move the cylinder in opposition to the force of the spring-arm $s$, engaged with the indicator-wheel. The further movement of the shaft causes the rear wall of the notch $v^2$ to engage with and push upon the arm Q, whereupon the cylinder is moved. The end of the indicator spring-arm rides up the side of the notch in which it lies until it is near the top thereof, when the spring W, acting through the arm $q$ upon the cylinder, moves said cylinder from one of its stopping-points to the next, when the arm $s$ enters the next notch in the indicator-wheel S and stops the cylinder. By reason of this construction the motorman cannot move the cylinder slowly to reduce the current. He moves the shaft without moving the cylinder until considerable tension is applied to the spring, and then when the cylinder is released the spring moves the cylinder instantly from one position to another. When the shaft is turned in the opposite direction, the arm $v$ presses against the arm $q$, and thereby the cylinder is turned.

Having described my invention, I claim—

1. The herein described process of reducing the current for electric motors on street cars and the like, which consists in connecting in some part of the circuit then existing an arc spanning system which includes a plurality of separable contacts in series, then connecting up the reduced circuit in parallel with that part of first circuit which contains the arc spanning system, and then, after both of the above named steps have been performed in either order, simultaneously separating a plurality of said separable contacts, substantially as and for the purpose specified.

2. The herein described process of reducing the current for electric motors on street cars and the like by introducing resistance into the circuit, which consists in connecting said resistance, in series, in the circuit, forming around the resistance so connected a shunt which includes a plurality of separable contacts in series, and finally simultaneously breaking a plurality of contacts in said shunt, substantially as and for the purpose specified.

3. The combination of a switch having thereon controller strips, and arc spanning strips, with corresponding fingers adapted to engage with some of the controller strips in every position of the switch and with the arc spanning strips in alternate positions thereof, said strips and fingers being connected substantially as described whereby in every alternate position of the switch the arc spanning strips and corresponding fingers are connected, in series, in the circuit, for the purpose specified.

4. The combination of a switch having thereon controller strips some of which lie in every vertical row which corresponds to the several positions of the switch, and arc spanning strips which lie in every other of said vertical rows, with contact fingers which correspond and are adapted to engage with said strips, the fingers which form contacts with the arc spanning strips being connected with each other, the other fingers being connected with the resistances, motors, ground and trolley, and the strips being connected with each other substantially as described, whereby, in alternate positions of the switch the arc spanning strips and their fingers are connected, in series, in the circuit, substantially as and for the purpose specified.

5. The combination of a rotatable shaft, a controller cylinder loosely mounted thereon, a notched indicator wheel secured to said cylinder, and a spring arm adapted to engage with said indicator wheel, with a hub rigidly secured to said shaft and having a notched radial arm, an arm secured to the lower end of the cylinder and extending downward into the notch in said arm and fitting loosely therein, and a longitudinally expansible coil spring which is secured at its ends respectively to the hub and cylinder, substantially as and for the purpose specified.

In testimony whereof I affix my signature in presence of two witnesses.

THORSTEN VON ZWEIGBERGK.

Witnesses:
EDWIN L. THURSTON,
L. S. GRISWOLD.